United States Patent
Wu

(10) Patent No.: US 11,128,216 B2
(45) Date of Patent: Sep. 21, 2021

(54) CONVERTER, STEP-DOWN METHOD BASED ON THE CONVERTER AND ELECTRONIC DEVICE

(71) Applicant: ZHENGZHOU YUNHAI INFORMATION TECHNOLOGY CO., LTD., Henan (CN)

(72) Inventor: Fukuan Wu, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 581 days.

(21) Appl. No.: 16/097,237

(22) PCT Filed: Nov. 30, 2017

(86) PCT No.: PCT/CN2017/113867
§ 371 (c)(1),
(2) Date: Oct. 26, 2018

(87) PCT Pub. No.: WO2019/015205
PCT Pub. Date: Jan. 24, 2019

(65) Prior Publication Data
US 2021/0226533 A1 Jul. 22, 2021

(30) Foreign Application Priority Data
Jul. 18, 2017 (CN) .......................... 201710586383.9

(51) Int. Cl.
*H02M 3/158* (2006.01)
*H02M 1/32* (2007.01)
*H02M 1/14* (2006.01)

(52) U.S. Cl.
CPC ............. *H02M 3/158* (2013.01); *H02M 1/14* (2013.01); *H02M 1/32* (2013.01)

(58) Field of Classification Search
CPC ........ H02M 1/0006; H02M 1/32; H02M 1/08; H02M 1/36; H02M 3/1582; H02M 3/1588
See application file for complete search history.

(56) References Cited

U.S. PATENT DOCUMENTS

| | | | | |
|---|---|---|---|---|
| 4,373,139 A | * | 2/1983 | Beesley | G01R 19/22 327/102 |
| 4,405,964 A | * | 9/1983 | Woods | H02M 3/155 361/18 |

(Continued)

FOREIGN PATENT DOCUMENTS

| | | |
|---|---|---|
| CN | 101282083 A | 10/2008 |
| CN | 103683982 A | 3/2014 |

(Continued)

OTHER PUBLICATIONS

International Search Report for PCT/CN2017/113867 dated Apr. 19, 2018, ISA/CN.

*Primary Examiner* — Rafael O De Leon Domenech
(74) *Attorney, Agent, or Firm* — Yue (Robert) Xu; Apex Attorneys at Law, LLP

(57) ABSTRACT

A converter includes a control chip, a switching transistor, a step-down circuit and a linear power circuit. The control chip is configured to: convert an input voltage from an external power supply module into a control voltage; when a bootstrap voltage is received, convert the bootstrap voltage into the control voltage and stop converting the input voltage; and control the switching transistor to be periodically turned on and off based on the control voltage to cause the power supply module to periodically output the input voltage to the step-down circuit. The step-down circuit is configured to generate an operating voltage based on the input voltage and outputs the operating voltage to an electrical unit and the linear power circuit. The linear power (Continued)

circuit is configured to convert the operating voltage into the bootstrap voltage and output the bootstrap voltage to the control chip.

15 Claims, 3 Drawing Sheets

(56) References Cited

U.S. PATENT DOCUMENTS

| | | | | |
|---|---|---|---|---|
| 6,184,667 | B1* | 2/2001 | Lacey | H02M 3/1563 |
| | | | | 323/282 |
| 8,085,519 | B2* | 12/2011 | Storm | H05B 41/2853 |
| | | | | 361/91.8 |
| 2002/0079948 | A1* | 6/2002 | Moriconi | H02M 3/155 |
| | | | | 327/390 |
| 2003/0151447 | A1* | 8/2003 | Moriconi | H02M 3/1588 |
| | | | | 327/536 |
| 2017/0117803 | A1* | 4/2017 | Matsuki | H02M 1/08 |
| 2017/0133929 | A1* | 5/2017 | Matsuki | H02M 1/32 |
| 2017/0324411 | A1* | 11/2017 | Gong | H03K 19/01735 |

FOREIGN PATENT DOCUMENTS

| | | | |
|---|---|---|---|
| CN | 106712506 | A | 5/2017 |
| CN | 107147287 | A | 9/2017 |

* cited by examiner

CONVERTER, STEP-DOWN METHOD BASED ON THE CONVERTER AND ELECTRONIC DEVICE

The present application is a national phase application of PCT international patent application PCT/CN2017/113867, filed on Nov. 30, 2017 which claims the priority to Chinese Patent Application No. 201710586383.9, titled "CONVERTER, STEP-DOWN METHOD BASED ON THE CONVERTER AND ELECTRONIC DEVICE", filed on Jul. 18, 2017 with Chinese Patent Office, both of which are incorporated herein by reference in their entireties.

FIELD

The present disclosure relates to the technical field of electric engineering, and particularly to a converter, a step-down method based on the converter, and an electronic device.

BACKGROUND

In an electronic device, such as a server, internal electrical units of the electronic device correspond to different operating voltages. After a relatively high input voltage obtained, step-down conversion usually needs to be performed on the relatively high input voltage by different converters to generate operating voltages corresponding to the electrical units.

In conventional technology, a converter usually includes a control chip, a switching transistor, and a step-down circuit. The control chip may control the switching transistor to be periodically turned on and turned off based on the input voltage from an external power supply module, to cause the input voltage from the external power supply module to be periodically outputted to the step-down circuit via the switching transistor. The step-down circuit may provide an operating voltage which is much less than the input voltage to an external electrical unit based on the periodical received input voltage.

In the above technology solution, the control chip needs to convert the high input voltage into a low control voltage, and to control the switching transistor to be periodically turned on and turned off based on the converted control voltage. Power consumption of the control chip is large, and a conversion efficiency of the converter is low.

SUMMARY

A converter, a step-down method based on the converter, and an electronic device are provided according to embodiments of the present disclosure, to improve the conversion efficiency of the converter.

In a first aspect, a converter is provided according to the present disclosure. The converter includes: a control chip, a switching transistor, a step-down circuit and a linear power circuit. The control chip is configured to: perform step-down conversion on an input voltage from an external power supply module to generate a control voltage; when the control chip receives a bootstrap voltage outputted from the linear power circuit, perform step-down conversion on the bootstrap voltage to generate the control voltage and stop an operation of performing the step-down conversion on the input voltage from the external power supply module to generate the control voltage; and control the switching transistor to be periodically turned on and turned off based on the control voltage to cause the external power supply module to periodically output the input voltage to the step-down circuit via the switching transistor. The step-down circuit is configured to generate an operating voltage based on the periodically received input voltage and output the operating voltage to an external electrical unit and the linear power circuit. The operating voltage is less than the input voltage. The linear power circuit is configured to, when the linear power circuit receives the operating voltage outputted from the step-down circuit, perform step-down conversion on the received operating voltage to generate the bootstrap voltage and output the bootstrap voltage to the control chip.

Preferably, the step-down circuit includes a freewheeling diode and an inductor coil. A cathode of the freewheeling diode is connected with an input end of the inductor coil, an anode of the freewheeling diode is grounded. The input end of the inductor coil is connected with the switching transistor, an output end of the inductor coil is connected with the linear power circuit and the external electrical unit.

Preferably, the linear power circuit includes a triode, a resistor, and a Zener diode. A first end of the resistor is connected with the output end of the inductor coil, a second end of the resistor is connected with a base of the triode. A collector of the triode is connected with the output end of the inductor coil, an emitter of the triode is connected with the control chip. A cathode of the Zener diode is connected with the second end of the resistor, an anode of the Zener diode is grounded.

Preferably, the converter further includes a backflow prevention diode. An anode of the backflow prevention diode is connected with the output end of the inductor coil, and a cathode of the backflow prevention diode is connected with the collector of the triode and the resistor.

Preferably, the converter further includes a voltage stabilization output circuit. The voltage stabilization output circuit includes at least one first filter capacitor. A positive electrode of each of the at least one first filter capacitor is connected with the output end of the inductor coil, a negative electrode of each of the at least one first filter capacitor is grounded.

Preferably, the converter further includes a voltage stabilization input circuit. The voltage stabilization input circuit includes at least one second filter capacitor. A positive electrode of each of the at least one second filter capacitor is connected with the switching transistor, a negative electrode of each of the at least one second filter capacitor is grounded.

Preferably, the switching transistor includes a MOS (metal oxide semiconductor) transistor or a triode.

In a second aspect, a step-down method based on any one of the converters described in the first aspect is provided according to an embodiment of the disclosure. The method includes:

S1, performing, by a control chip, step-down conversion on an input voltage from an external power supply module to generate a control voltage;

S2, controlling, by the control chip, a switching transistor to be periodically turned on and turned off based on the control voltage to cause the external power supply module to periodically output the input voltage to a step-down circuit via the switching transistor;

S3, generating, by the step-down circuit, an operating voltage based on the periodically received input voltage and outputting, by the step-down circuit, the operating voltage to an external electrical unit and a linear power circuit;

S4, performing, by the linear power circuit, step-down conversion on the received operating voltage to generate a bootstrap voltage and outputting, by the linear power circuit, the bootstrap voltage to the control chip; and S5, performing, by the control chip, step-down conversion on the received bootstrap voltage to generate the control voltage and stop performing S1.

In a third aspect, an electronic device is provided according to an embodiment of the disclosure. The electronic device includes a power supply module, at least one electrical unit, and at least one converter described in the first aspect. Each of the at least one converter is connected with the power supply module. Each of the at least one converter is connected with at least one electrical unit. The power supply module is configured to provide an input voltage to each of the at least one converter.

Preferably, the electronic device is a server.

A converter, a step-down method based on the converter, and an electronic device are provided according to the embodiments of the present disclosure. The converter includes a control chip, a switching transistor, a step-down circuit, and a linear power circuit. The control chip may firstly perform step-down conversion on an input voltage from an external power supply module to generate a control voltage, and then control the switching transistor to be periodically turned on and turned off based on the control voltage to cause the external power supply module to periodically output the input voltage to the step-down circuit via the switching transistor. The step-down circuit may generate an operating voltage less than the input voltage based on the periodically received input voltage and output the operating voltage to an external electrical unit and the linear power circuit. The linear power circuit may perform step-down conversion on the received operating voltage to generate a bootstrap voltage less that the operating voltage and output the bootstrap voltage to the control chip. In this case, the control chip may perform step-down conversion on the received bootstrap voltage to generate the control voltage and stop an operation of performing the step-down conversion on the input voltage from the external power supply module to generate the control voltage. As can be seen that, since the bootstrap voltage is less than the input voltage, after the step-down circuit can output the operating voltage to the linear power circuit and the external electrical unit, the control chip performs step-down conversion only on the less bootstrap voltage outputted from the linear power circuit to generate the control voltage, no longer performs the step-down conversion on the greater input voltage from the power supply module to generate the control voltage. In this way, power consumption of the control chip is reduced, and the conversion efficiency of the converter is improved.

BRIEF DESCRIPTION OF THE DRAWINGS

For explaining technical solutions according to embodiments of the disclosure or the conventional technology more clearly, drawings used in the illustration of the embodiments or the conventional technology are described briefly. Apparently, the drawings in the following description are merely some of the embodiments of the disclosure, and other drawings may be obtained based on the drawings by those skilled in the art without any creative effort.

DETAILED DESCRIPTION

In order to make the object, technical solutions and advantages of the embodiments of the disclosure more clear, technical solutions according to the embodiments of the present disclosure are described clearly and completely in conjunction with drawings. It is apparent that the described embodiments are only a few rather than all of the embodiments according to the present disclosure. Any other embodiments obtained by those skilled in the art based on the embodiments in the present disclosure without any creative work fall in the protection scope of the present disclosure.

Figure 1:
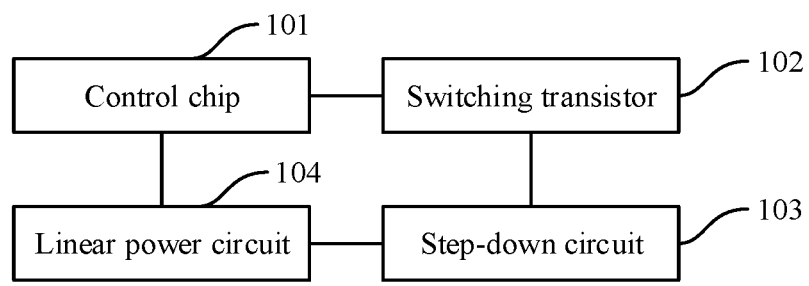
FIG. 1 is a schematic structural view of a converter according to an embodiment of the present disclosure.

As illustrated in FIG. 1, a converter is provided according to an embodiment of the present disclosure. The converter includes a control chip 10, a switching transistor 20, a step-down circuit 30 and a linear power circuit 40.

The control chip 10 is configured to: perform step-down conversion on an input voltage from an external power supply module to generate a control voltage; when the control chip receives a bootstrap voltage outputted from the linear power circuit 40, perform step-down conversion on the bootstrap voltage to generate the control voltage and stop an operation of performing the step-down conversion on the input voltage from the external power supply module to generate the control voltage; and control the switching transistor 20 to be periodically turned on and turned off based on the control voltage to cause the external power supply module to periodically output the input voltage to the step-down circuit 30 via the switching transistor 20.

The step-down circuit 30 is configured to generate an operating voltage based on the periodically received input voltage and output the operating voltage to an external electrical unit and the linear power circuit 40. The operating voltage is less than the input voltage.

The linear power circuit 40 is configured to, when the linear power circuit receives the operating voltage outputted from the step-down circuit, perform step-down conversion on the received operating voltage to generate the bootstrap voltage and output the bootstrap voltage to the control chip.

In the above embodiment of the disclosure, the converter includes a control chip, a switching transistor, a step-down circuit, and a linear power circuit. The control chip may firstly perform step-down conversion on an input voltage from an external power supply module to generate a control voltage, and then control the switching transistor to be periodically turned on and turned off based on the control voltage to cause the external power supply module to periodically output the input voltage to the step-down circuit via the switching transistor. The step-down circuit may generate an operating voltage less than the input voltage based on the periodically received input voltage and output the operating voltage to an external electrical unit and the linear power circuit. The linear power circuit may perform step-down conversion on the received operating voltage to generate a bootstrap voltage less that the operating voltage and output the bootstrap voltage to the control chip. In this case, the control chip may perform step-down conversion on the received bootstrap voltage to generate the control voltage and stop an operation of performing the step-down conversion on the input voltage from the external power supply module to generate the control voltage. As can be seen that, since the bootstrap voltage is less than the input voltage, after the step-down circuit can output the operating voltage to the linear power circuit and the external electrical unit, the control chip performs step-down conversion only on the less bootstrap voltage outputted from the linear power circuit to generate the control voltage, no longer performs the step-down conversion on the greater input voltage from the power supply module to generate the control voltage. In this way, power consumption of the control chip is reduced, and the conversion efficiency of the converter is improved.

Figure 2:
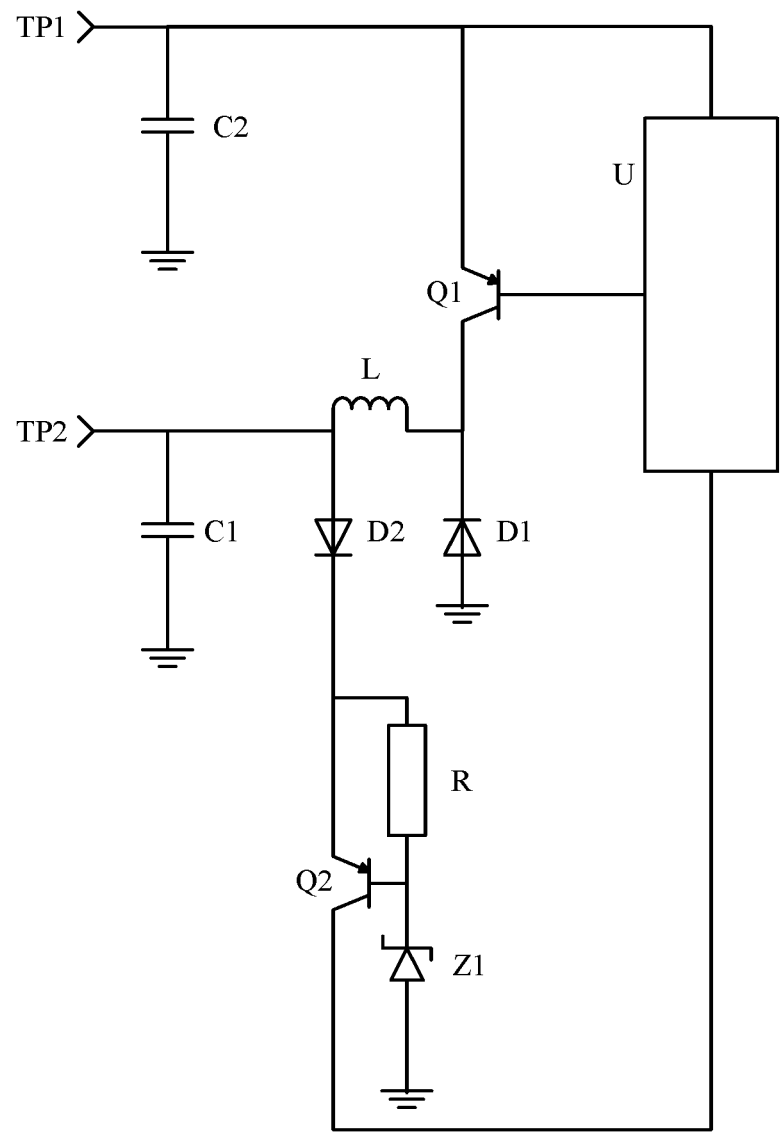
FIG. 2 is a schematic structural view of a converter according to another embodiment of the present disclosure.

Specifically, in order to generate the operating voltage which is less than the input voltage based on the periodically provided input voltage, as illustrated in FIG. 2, in an embodiment of the present disclosure, the step-down circuit 30 includes a freewheeling diode D1 and an inductor coil L. A cathode of the freewheeling diode D1 is connected with an input end of the inductor coil L, an anode of the freewheeling diode D1 is grounded. The input end of the inductor coil L is connected with the switching transistor Q1, an output end of the inductor coil L is connected with the linear power circuit 40 and the external electrical unit.

In the embodiment, the control chip controls the switching transistor to be periodically turned on and turned off. When the switching transistor is turned on, the input voltage provided by the power supply module is outputted to the inductor coil via the switching transistor. The inductor coil accumulates electrical energy. Electromotive force is generated on the inductor coil of which the input end is positive and the output end is negative, such that the output end of the inductor coil can output the operating voltage less than the input voltage to the linear power circuit and the external electrical unit. When the switching transistor is turned off, a current direction in the inductor coil cannot mutate, and the input end of the inductor coil is connected with a diode, an anode of the diode is grounded, therefore, an electric potential of the input end of the inductor coil is pulled down. An impulse voltage is generated because of self-inductance of the inductor coil, of which the input end is positive and the output end is negative, such that the output end of the inductor coil discharges, and then the inductor coil may continue to output the operating voltage which is less than the input voltage to the linear power circuit and the external electrical unit.

It should be understood that a turn-on voltage of a Zener diode should be greater than the control voltage generated by the control chip, and less than a maximum withstand voltage of a pin of the control chip which is connected with an emitter of a triode.

Specifically, to ensure that the bootstrap voltage which is inputted to the control chip from the linear power circuit is not too high to damage the control chip, as illustrated in FIG. 2, in an embodiment of the disclosure, the linear power circuit 40 includes a triode Q2, a resistor R, and a Zener diode Z1. A first end of the resistor R is connected with the output end of the inductor coil L, a second end of the resistor R is connected with a base of the triode Q2. A collector of the triode Q2 is connected with the output end of the inductor coil L, an emitter of the triode Q2 is connected with the control chip U. A cathode of the Zener diode Z1 is connected with the second end of the resistor R, an anode of the Zener diode Z1 is grounded.

For example, the converter converts an input voltage of 48V into an operating voltage of 12V and outputs the operating voltage of 12V to the electrical unit. The control voltage generated by the control chip is 8V, the emitter of the triode may be connected with a VBP pin of the control chip, a maximum withstand voltage of the VBP is 8.8V. Since an operating voltage received by conventional power supply is 12V, a Zener diode with a turn-on voltage of 8.6V is used. The input voltage of 12V may be converted into a bootstrap voltage of about 8.4V by a conventional power circuit composed of the resistor, the triode, and the Zener diode, such that the bootstrap voltage is greater than the control voltage of 8V generated by the control chip and is less than the maximum withstand voltage of the VBP pin of the control chip. In this way, the bootstrap voltage provided by the linear power circuit to the control chip may be converted into the control voltage by the control chip, and the control chip may not be damaged due to the bootstrap voltage provided to the control chip exceeding the maximum withstand voltage of the VBP pin in the control chip.

As illustrated in FIG. 2, in the embodiment of the present disclosure, the converter further includes a backflow prevention diode D2. An anode of the backflow prevention diode D2 is connected with the output end of the inductor coil L, and a cathode of the backflow prevention diode D2 is connected with the collector of the triode Q2 and the resistor R. By adding the backflow prevention diode between the linear power circuit and the inductor coil, it may be avoided, based on a characteristic of unilateral conduction of the backflow prevention diode, a case that the linear power circuit generates an interference current and transmits the interference current to the output end of the inductor coil. Therefore, it is ensured that the output end of the inductor coil does not receive the interference current generated by the linear power circuit, and to avoid an impact of the linear power circuit on the operating voltage outputted by the inductor coil.

Furthermore, since the operating voltage outputted from the inductor coil usually has a large power ripple, in order to filter the power ripple in the outputted operating voltage and output stable direct current operating voltage to the external electrical unit, as illustrated in FIG. 2, in an embodiment of the present disclosure, the converter further includes a voltage stabilization output circuit. The voltage stabilization output circuit includes at least one first filter capacitor C1. A positive electrode of each of the at least one first filter capacitor C1 is connected with the output end of the inductor coil L, a negative electrode of each of the at least one first filter capacitor C1 is grounded.

Correspondingly, to filter a power ripple carried in the input voltage and ensure that the control chip and the step-down circuit may receive the stable direct current input voltage, as illustrated in FIG. 2, in an embodiment of the present disclosure, the converter further includes a voltage stabilization input circuit. The voltage stabilization input circuit includes at least one second filter capacitor C2. A positive electrode of each of the at least one second filter capacitor C2 is connected with the switching transistor Q1, a negative electrode of each of the at least one second filter capacitor C2 is grounded.

In an embodiment of the present disclosure, the switching transistor includes a MOS transistor or a triode. Herein, the control chip may output a PWM (Pulse Width Modulation) signal corresponding to the control voltage to the MOS transistor or the triode to control the MOS transistor or the triode to be periodically turned on and turned off.

It can be understood that a node marked as TP1 in FIG. 2 may be connected with the externally power supply module, a node marked as TP2 in FIG. 2 may be connected with the external electrical unit.

Figure 3:
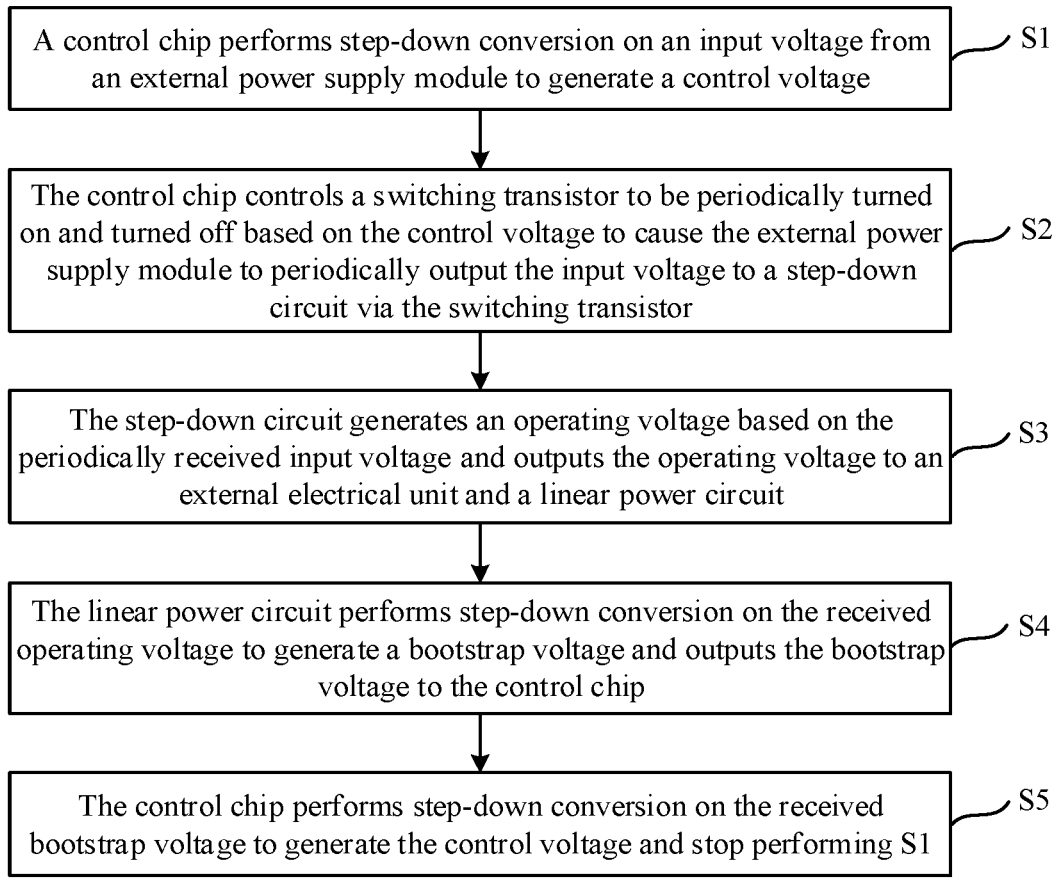
FIG. 3 is a flow chart of a step-down method based on the converter according to an embodiment of the present disclosure.

As illustrated in FIG. 3, an embodiment of the present disclosure provides a step-down method based on the converter according to any one of embodiments of the present disclosure. The method includes S1 to S5.

In S1, a control chip performs step-down conversion on an input voltage from an external power supply module to generate a control voltage.

In S2, the control chip controls a switching transistor to be periodically turned on and turned off based on the control voltage to cause the external power supply module to periodically output the input voltage to a step-down circuit via the switching transistor.

In S3, the step-down circuit generates an operating voltage based on the periodically received input voltage and outputs the operating voltage to an external electrical unit and a linear power circuit.

In S4, the linear power circuit performs step-down conversion on the received operating voltage to generate a bootstrap voltage and outputs the bootstrap voltage to the control chip.

In S5, the control chip performs step-down conversion on the received bootstrap voltage to generate the control voltage and stop performing S1.

In the embodiment of the present disclosure, the control chip of the converter only converts the greater input voltage provided by the power supply module into the less control voltage in an initial stage to control the switching transistor to be periodically turned on and turned off. After the step-down circuit can output the operating voltage, the linear power circuit may convert the operating voltage outputted by the step-down circuit into the bootstrap voltage less than the operating voltage, and the control chip may convert the received bootstrap voltage into the control voltage and stop converting the input voltage provided by the power supply module into the control voltage. In subsequent process, the control chip may control the switching transistor to be periodically turned on and turned off based on the control voltage converted from the bootstrap voltage to make the step-down circuit output the operating voltage persistently.

For example, the output voltage is 48V, the operating voltage is 12V, the bootstrap voltage is 8.4V, and the control voltage is 8V. After the step-down circuit can stably output the operating voltage of 12V, the control chip only converts the bootstrap voltage of 8.4V into the control voltage of 8V, and does not convert the input voltage of 48V into the control chip of 8V, such that power consumption of the control chip is reduced significantly.

Figure 4:
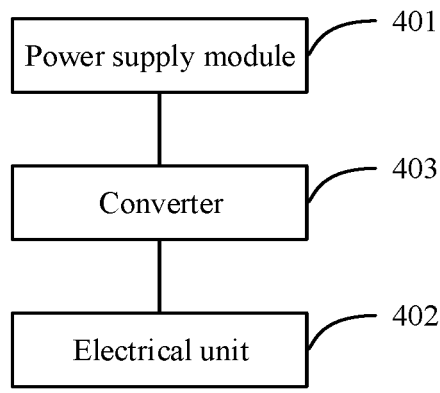
FIG. 4 is a schematic structural view of an electronic device according to an embodiment of the present disclosure.

As illustrated in FIG. 4, an electronic device is provided according to an embodiment of the present disclosure. The electronic device includes a power supply module 401, at least one electrical unit 402, and at least one converter 403 according to any one of embodiments of the disclosure. Each of the at least one converter 403 is connected with the power supply module 401. Each of the at least one converter 403 is connected with at least one electrical unit 402. The power supply module 401 is configured to provide an input voltage to each of the at least one converter 403.

In an embodiment of the present disclosure, the electronic device may be a server. Since the power consumption of the control chip in the converter is low, such that power consumption of the server is relatively low, and product competitiveness of the server provided in the embodiment of the present disclosure is high.

From the above, the embodiments of the present disclosure have at least the following advantageous effects.

1. In an embodiment of the disclosure, the converter includes a control chip, a switching transistor, a step-down circuit, and a linear power circuit. The control chip may firstly perform step-down conversion on an input voltage from an external power supply module to generate a control voltage, and then control the switching transistor to be periodically turned on and turned off based on the control voltage to cause the external power supply module to periodically output the input voltage to the step-down circuit via the switching transistor. The step-down circuit may generate an operating voltage less than the input voltage based on the periodically received input voltage and output the operating voltage to an external electrical unit and the linear power circuit. The linear power circuit may perform step-down conversion on the received operating voltage to generate a bootstrap voltage less that the operating voltage and output the bootstrap voltage to the control chip. In this case, the control chip may perform step-down conversion on the received bootstrap voltage to generate the control voltage and stop an operation of performing the step-down conversion on the input voltage from the external power supply module to generate the control voltage. As can be seen that, since the bootstrap voltage is less than the input voltage, after the step-down circuit can output the operating voltage to the linear power circuit and the external electrical unit, the control chip performs step-down conversion only on the less bootstrap voltage outputted from the linear power circuit to generate the control voltage, no longer performs the step-down conversion on the greater input voltage from the power supply module to generate the control voltage. In this way, power consumption of the control chip is reduced, and the conversion efficiency of the converter is improved.

2. In an embodiment of the present disclosure, the linear power circuit includes a triode, a resistor, and a Zener diode. A first end of the resistor is connected with the output end of the inductor coil, a second end of the resistor is connected with a base of the triode. A collector of the triode is connected with the output end of the inductor coil, an emitter of the triode is connected with the control chip. A cathode of the Zener diode is connected with the second end of the resistor, an anode of the Zener diode is grounded. A turn-on voltage of a Zener diode is greater than the control voltage generated by the control chip, and less than a maximum withstand voltage of a pin of the control chip which is connected with an emitter of a triode. On one hand, the bootstrap voltage provided by the linear power circuit to the control chip may be converted into the control voltage by the control chip. On the other hand, the control chip may not be damaged due to the bootstrap voltage exceeding the maximum withstand voltage of the corresponding pin in the control chip.

3. In an embodiment of the present disclosure, by adding the backflow prevention diode between the linear power circuit and the inductor coil, it may be avoided, based on a characteristic of unilateral conduction of the backflow prevention diode, a case that the linear power circuit generates an interference current and transmits the interference current to the output end of the inductor coil. Therefore, it is ensured that the output end of the inductor coil does not receive the interference current generated by the linear power circuit, and to avoid an impact of the linear power circuit on the operating voltage outputted by the inductor coil.

4. In an embodiment of the present disclosure, by setting the voltage stabilization output circuit which includes one or more first filter capacitors, the power ripple in the operating voltage outputted by the inductor coil may be filtered via the voltage stabilization output circuit, and the stable direct current operating voltage may be outputted to the external electrical unit.

5. In an embodiment of the present disclosure, by setting the voltage stabilization input circuit which includes multiple second filter capacitors, the power ripple in the operating voltage supplied by the external power supply module may be filtered via the voltage stabilization input circuit, and the control chip and the step-down circuit may receive the stable direct current input voltage.

6. In an embodiment of the present disclosure, since the power consumption of the control chip in the converter is low, such that temperature of the control chip wouldn't be too high, and an impact on service life of the control chip due to high operating temperature is avoided.

7. In an embodiment of the present disclosure, the electronic device may be a server. Since the power consumption of the control chip of the converter is low, such that the power consumption of the server is relatively low, and the product competitiveness of the server is improved.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

It should be noted finally that the embodiments are only preferred implementations of the present disclosure, are only used to describe technical solutions of the present disclosure, and should not be interpreted as limitation to the protection scope of the present disclosure. Any modifications, equivalent replacements and improvements made within the spirit and principle of the present disclosure are also deemed to fall into the protection scope of the present application.

The invention claimed is:

1. A converter comprising:
   a control chip, a switching transistor, a step-down circuit and a linear power circuit; wherein
   the control chip is configured to: perform step-down conversion on an input voltage from an external power supply module to generate a control voltage; when the control chip receives a bootstrap voltage outputted from the linear power circuit, perform step-down conversion on the bootstrap voltage to generate the control voltage and stop an operation of performing the step-down conversion on the input voltage from the external power supply module to generate the control voltage; and control the switching transistor to be periodically turned on and turned off based on the control voltage to cause the external power supply module to periodically output the input voltage to the step-down circuit via the switching transistor;
   the step-down circuit is configured to generate an operating voltage based on the periodically received input voltage and output the operating voltage to an external electrical unit and the linear power circuit, wherein the operating voltage is less than the input voltage; and
   the linear power circuit is configured to, when the linear power circuit receives the operating voltage outputted from the step-down circuit, perform step-down conversion on the received operating voltage to generate the bootstrap voltage and output the bootstrap voltage to the control chip.

2. The converter according to claim 1, wherein the step-down circuit comprises a freewheeling diode and an inductor coil, wherein
   a cathode of the freewheeling diode is connected with an input end of the inductor coil, an anode of the freewheeling diode is grounded; and
   the input end of the inductor coil is connected with the switching transistor, an output end of the inductor coil is connected with the linear power circuit and the external electrical unit.

3. The converter according to claim 2, wherein the linear power circuit comprises a triode, a resistor, and a Zener diode, wherein
   a first end of the resistor is connected with the output end of the inductor coil, a second end of the resistor is connected with a base of the triode;
   a collector of the triode is connected with the output end of the inductor coil, an emitter of the triode is connected with the control chip; and
   a cathode of the Zener diode is connected with the second end of the resistor, an anode of the Zener diode is grounded.

4. The converter according to claim 3, further comprising a backflow prevention diode, wherein
   an anode of the backflow prevention diode is connected with the output end of the inductor coil, and a cathode of the backflow prevention diode is connected with the collector of the triode and the resistor.

5. The converter according to claim 2, further comprising a voltage stabilization output circuit, wherein
   the voltage stabilization output circuit comprises at least one first filter capacitor; and
   a positive electrode of each of the at least one first filter capacitor is connected with the output end of the inductor coil, a negative electrode of each of the at least one first filter capacitor is grounded.

6. The converter according to claim 1, further comprising a voltage stabilization input circuit, wherein
   the voltage stabilization input circuit comprises at least one second filter capacitor; and
   a positive electrode of each of the at least one second filter capacitor is connected with the switching transistor, a negative electrode of each of the at least one second filter capacitor is grounded.

7. The converter according to claim 1, wherein
   the switching transistor comprises a metal oxide semiconductor MOS transistor or a triode.

8. A step-down method comprising:
   S1, performing, by a control chip, step-down conversion on an input voltage from an external power supply module to generate a control voltage;
   S2, controlling, by the control chip, a switching transistor to be periodically turned on and turned off based on the control voltage to cause the external power supply module to periodically output the input voltage to a step-down circuit via the switching transistor;
   S3, generating, by the step-down circuit, an operating voltage based on the periodically received input voltage and outputting, by the step-down circuit, the operating voltage to an external electrical unit and a linear power circuit;
   S4, performing, by the linear power circuit, step-down conversion on the received operating voltage to generate a bootstrap voltage and outputting, by the linear power circuit, the bootstrap voltage to the control chip; and S5, performing, by the control chip, step-down conversion on the received bootstrap voltage to generate the control voltage and stop performing S1.

9. An electronic device comprising:
a power supply module, at least one electrical unit, and at least one converter, wherein
each of the at least one converter is connected with the power supply module;
each of the at least one converter is connected with at least one electrical unit; and
the power supply module is configured to provide an input voltage to each of the at least one converter,
wherein the converter comprises:
a control chip, a switching transistor, a step-down circuit and a linear power circuit wherein
the control chip is configured to: perform step-down conversion on an input voltage from an external power supply module to generate a control voltage; when the control chip receives a bootstrap voltage outputted from the linear power circuit, perform step-down conversion on the bootstrap voltage to generate the control voltage and stop an operation of performing the step-down conversion on the input voltage from the external power supply module to generate the control voltage; and control the switching transistor to be periodically turned on and turned off based on the control voltage to cause the external power supply module to periodically output the input voltage to the step-down circuit via the switching transistor;
the step-down circuit is configured to generate an operating voltage based on the periodically received input voltage and output the operating voltage to an external electrical unit and the linear power circuit, wherein the operating voltage is less than the input voltage; and
the linear power circuit is configured to, when the linear power circuit receives the operating voltage outputted from the step-down circuit, perform step-down conversion on the received operating voltage to generate the bootstrap voltage and output the bootstrap voltage to the control chip.

10. The electronic device according to claim 9, wherein the electronic device is a server.

11. The electronic device according to claim 9, wherein the step-down circuit comprises a freewheeling diode and an inductor coil, wherein a cathode of the freewheeling diode is connected with an input end of the inductor coil, an anode of the freewheeling diode is grounded; and
the input end of the inductor coil is connected with the switching transistor, an output end of the inductor coil is connected with the linear power circuit and the external electrical unit.

12. The electronic device according to claim 11, wherein the linear power circuit comprises a triode, a resistor, and a Zener diode, wherein
a first end of the resistor is connected with the output end of the inductor coil, a second end of the resistor is connected with a base of the triode;
a collector of the triode is connected with the output end of the inductor coil, an emitter of the triode is connected with the control chip; and
a cathode of the Zener diode is connected with the second end of the resistor, an anode of the Zener diode is grounded.

13. The electronic device according to claim 12, wherein the converter further comprises a backflow prevention diode, wherein
an anode of the backflow prevention diode is connected with the output end of the inductor coil, and a cathode of the backflow prevention diode is connected with the collector of the triode and the resistor.

14. The electronic device according to claim 11, wherein the converter further comprises a voltage stabilization output circuit, wherein
the voltage stabilization output circuit comprises at least one first filter capacitor; and
a positive electrode of each of the at least one first filter capacitor is connected with the output end of the inductor coil, a negative electrode of each of the at least one first filter capacitor is grounded.

15. The electronic device according to claim 9, wherein the converter further comprises a voltage stabilization input circuit, wherein
the voltage stabilization input circuit comprises at least one second filter capacitor; and
a positive electrode of each of the at least one second filter capacitor is connected with the switching transistor, a negative electrode of each of the at least one second filter capacitor is grounded.

* * * * *